United States Patent
Yamaguchi et al.

(10) Patent No.: US 10,102,647 B2
(45) Date of Patent: Oct. 16, 2018

(54) IMAGE PROCESSING DEVICE, IMAGE PROCESSING METHOD, AND NON-TRANSITORY COMPUTER-READABLE STORAGE MEDIUM THAT DETERMINES CAMERA POSITION BASED ON A COMPARISON OF ESTIMATED POSTURES

(71) Applicant: FUJITSU LIMITED, Kawasaki-shi, Kanagawa (JP)

(72) Inventors: Nobuyasu Yamaguchi, Kawasaki (JP); Atsunori Moteki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 15/131,326

(22) Filed: Apr. 18, 2016

(65) Prior Publication Data
US 2016/0371829 A1 Dec. 22, 2016

(30) Foreign Application Priority Data
Jun. 16, 2015 (JP) .................................. 2015-121366

(51) Int. Cl.
G06T 7/70 (2017.01)
G06T 7/73 (2017.01)

(52) U.S. Cl.
CPC .................. *G06T 7/74* (2017.01); *G06T 7/70* (2017.01); *G06T 2207/30204* (2013.01); *G06T 2207/30244* (2013.01)

(58) Field of Classification Search
None
See application file for complete search history.

(56) References Cited

U.S. PATENT DOCUMENTS

2008/0069405 A1 3/2008 Endo et al.
2010/0045701 A1 2/2010 Scott et al.
(Continued)

FOREIGN PATENT DOCUMENTS

JP 2000-275013 10/2000
JP 2002-109539 4/2002
(Continued)

OTHER PUBLICATIONS

Hirotake Ishii et al. "Proposal and Evaluation of Decommissioning Support Method of Nuclear Power Plants Using Augmented Reality", Transactions of the Virtual Reality Society of Japan, vol. 13, No. 2, Jun. 2008, 12 pages (with English Abstract).
(Continued)

*Primary Examiner* — Justin P Misleh
(74) *Attorney, Agent, or Firm* — Oblon, McClelland, Maier & Neustadt, L.L.P.

(57) ABSTRACT

A device includes a processor configured to execute a first estimation process including detecting a marker from a captured image, and estimating first position and posture of a camera at a time when the captured image is captured, based on a shape of the marker, execute a second estimation process including obtaining a map point in a three-dimensional space from the memory, and estimating second position and posture of the camera at the time when the captured image is captured, based on a correspondence between a projection point in which the map point is projected on the captured image and a characteristic point extracted from the captured image, and select the first position and posture or the second position and posture based on a result of comparison between a first translational component of the first position and posture and a second translational component of the second position and posture.

12 Claims, 15 Drawing Sheets

(56) References Cited

U.S. PATENT DOCUMENTS

2015/0077434 A1    3/2015   Fukuchi et al.
2015/0228123 A1*   8/2015   Yasutake .............. G06T 19/006
                                                              345/633

FOREIGN PATENT DOCUMENTS

| | | |
|---|---|---|
| JP | 2008-70267 | 3/2008 |
| JP | 2013-225245 | 10/2013 |
| JP | 2014-92984 | 5/2014 |

OTHER PUBLICATIONS

Hirokazu Kato et al. "An Augmented Reality System and its Calibration Based on Marker Tracking", Transactions of the Virtual Reality Society of Japan, vol. 4, No. 4, Dec. 1999, 10 pages (with English Abstract).

Extended European Search Report dated Dec. 5, 2016 in patent application No. 16166595.5.

Office Action dated Jul. 18, 2017 in European Patent Application No. 16 166 595.5.

* cited by examiner

FIG. 1

|  | CAMERA POSITION AND POSTURE ||
|  | TRANSLATIONAL COMPONENT | ROTATIONAL COMPONENT |
| --- | --- | --- |
| MARKER SYSTEM | HIGH ACCURACY (PARTICULARLY, x, y DIRECTION) | ACCURACY IS SIGNIFICANTLY REDUCED WHEN IMAGE IS CAPTURED FROM FRONT |
| MARKERLESS SYSTEM | ACCURACY IS LOWER THAN IN MARKER RECOGNITION IN PARTICULAR, WHEN SHAPE SIMILAR TO NATURAL CHARACTERISTIC POINT IS PRESENT IN VICINITY THEREOF, ACCURACY MAY BE REDUCED (DROPPED) | IN GENERAL, ACCURACY IS HIGHER THAN IN MARKER RECOGNITION |

FIG. 4

| IDENTIFICATION NUMBER | THREE-DIMENSIONAL COORDINATES | AMOUNT OF CHARACTERISTIC | IMAGE PATTERN TEMPLATE |
|---|---|---|---|
| 1 | $(x_1, y_1, z_1)$ | $(M_{11}, M_{12}, ..., M_{1n})$ | Part Image 1 |
| 2 | $(x_2, y_2, z_2)$ | $(M_{21}, M_{22}, ..., M_{2n})$ | Part Image 2 |
| 3 | $(x_3, y_3, z_3)$ | $(M_{31}, M_{32}, ..., M_{3n})$ | Part Image 3 |
| 4 | $(x_4, y_4, z_4)$ | $(M_{41}, M_{42}, ..., M_{4n})$ | Part Image 4 |
| 5 | $(x_5, y_5, z_5)$ | $(M_{51}, M_{52}, ..., M_{5n})$ | Part Image 5 |
| 6 | $(x_6, y_6, z_6)$ | $(M_{61}, M_{62}, ..., M_{6n})$ | Part Image 6 |
| 7 | $(x_7, y_7, z_7)$ | $(M_{71}, M_{72}, ..., M_{7n})$ | Part Image 7 |
| 8 | $(x_8, y_8, z_8)$ | $(M_{81}, M_{82}, ..., M_{8n})$ | Part Image 8 |
| ⋮ | ⋮ | ⋮ | ⋮ |
| ⋮ | ⋮ | ⋮ | ⋮ |

--Prior Art--

—Prior Art—

—Prior Art—

---Prior Art---

—-Prior Art—-

IMAGE PROCESSING DEVICE, IMAGE PROCESSING METHOD, AND NON-TRANSITORY COMPUTER-READABLE STORAGE MEDIUM THAT DETERMINES CAMERA POSITION BASED ON A COMPARISON OF ESTIMATED POSTURES

CROSS-REFERENCE TO RELATED APPLICATION

This application is based upon and claims the benefit of priority of the prior Japanese Patent Application No. 2015-121366, filed on Jun. 16, 2015, the entire contents of which are incorporated herein by reference.

FIELD

The embodiments discussed herein are related to an image processing device and the like.

BACKGROUND

A technology has been developed that, based on an image captured by a camera attached to a personal computer (PC), a mobile terminal or the like, determines the position and posture of the camera relative to the captured image. In addition, augmented reality (AR) technology has been developed that displays additional information such as computer graphics (CG) using the position and posture of a camera, and achieves support of a user's work, the additional information being superimposed on a captured image displayed on a screen of a PC, a mobile terminal or the like.

FIG. 10 is an illustration depicting an example AR technology. As depicted in FIG. 10, for instance, when a user takes a picture of a marker 11 and an inspection object 12 using a camera built in a mobile terminal 10, object information 13 for the marker 11 is displayed on a display screen 10a of the mobile terminal 10.

The methods for determining the position and posture of a camera include, for instance, conventional technology 1 using a marker system and conventional technology 2 using a markerless system.

In the conventional technology 1 using a marker system, a marker with a geometric pattern preset in an object or object space is captured by a camera and the position and posture of the camera are calculated based on the shape of the marker. In many cases, a planar square with a side of a predetermined length is used for the marker, and the position and posture of the camera are calculated based on a reference point of the marker.

It is general that the center position of a marker is used as the origin of a three-dimensional coordinate system of the camera.

FIG. 11 is an illustration depicting an example definition of a coordinate system and the position and posture of a camera in a marker system. As depicted in FIG. 11, a marker 15 has reference points 15a, 15b, 15c, and 15d at four corners. Also, an origin 16 of the coordinate system is set to match the origin of a three-dimensional coordinate system of a camera 50.

In the conventional technology 2 using a markerless system, the position and posture of the camera are calculated using, for instance, a characteristic point included in a captured image. In the conventional technology 2, variation in shade is high near a point of attention and a characteristic point is detected based on that the position of the point of attention on the image is uniquely determined by the variation in shade. The conventional technology 2 uses a set of three-dimensional coordinates of characteristic points which have been previously generated. Hereinafter, three-dimensional coordinates of a previously generated characteristic point are referred to as a map point, and a set of map points is referred to as an initial map as appropriate. The conventional technology 2 calculates the position and posture of the camera by bringing a characteristic point present in a currently captured image into correspondence with a map point projected on the captured image.

FIG. 12 is an illustration for explaining the conventional technology 2 that determines the position and posture of a camera. In the example illustrated in FIG. 12, map points $S_1$ to $S_6$ are present. A map point $S_i$ is represented by Expression (1) in the world coordinate system. It is assumed that characteristic points $x_1$ to $x_6$ are present on a captured image 20. A characteristic point $x_i$ is represented by Expression (2) in a camera coordinate system. Let the map points projected on the captured image 20 be projection points $x_1'$ to $x_6'$. A projection point is represented by Expression (3) in the camera coordinate system.

$$S_i = (x, y, z) \tag{1}$$

$$x_i = (u, v) \tag{2}$$

$$x_i' = (u', v') \tag{3}$$

For instance, the conventional technology 2 determines the position and posture of the camera by calculating a camera position posture matrix RT so that the square sum E calculated by Expression (4) has a minimum.

$$E = \sum_p |x_p' - x_p|^2 \tag{4}$$

Next, the conventional technology 2 that generates an initial map will be described. FIG. 13 is an illustration for explaining the conventional technology 2 that generates an initial map. For instance, the principle of stereo photography is used in the conventional technology 2. The conventional technology 2 establishes correspondence between the same characteristic points in two captured images with different image capture positions. The conventional technology 2 generates an initial map in which each of a plurality of corresponding points having a correspondence therebetween is set to a map point based on the positional relationship of the corresponding points in the captured images.

In the example illustrated in FIG. 13, $S_i$ denotes a map point to be reconstructed, and a characteristic point $x_{ai}$ is defined as the intersection point between the line segment connecting an image capture position Ca of an initial camera and the map point $S_i$, and a first captured image 20a. A characteristic point $x_{bi}$ is defined as the intersection point between the line segment connecting an image capture position Cb of a second camera and the map point $S_i$, and a second captured image 20b. Then, the corresponding points are the characteristic point $x_{ai}$ and the characteristic point $x_{bi}$.

It is general that the camera position and the image-capture direction of the first captured image are applied to the origin of a three-dimensional coordinate system of the initial map. FIG. 14 is an illustration depicting an example definition of a coordinate system and position and posture of a camera in a markerless system. As depicted in FIG. 14, the origin of the three-dimensional coordinate system of the initial map is defined, for instance, relative to the position $(T_x, T_y, T_z)$ of a camera 10 and the image capture direction $(R_x, R_y, R_z)$.

Next, the advantages and disadvantages of the above-described marker system and markerless system will be described. An advantage of the marker system is that its resistance to an environmental change and motion of a camera is high and the robustness when the position and posture of a camera are detected is high. Another advantage of the marker system is that the position and posture of a camera are quickly detectable because a throughput for calculating the position and posture is low.

A disadvantage of the marker system is that when part of a marker is undetectable, the position and posture of a camera may not be calculated. Another disadvantage of the marker system is that when a marker is out of the image capture range of a camera, the position and posture of the camera may not be calculated. Another disadvantage of the marker system is that when a marker is captured from the front, the accuracy of calculation of the position and posture of a camera is reduced due to the calculation principle.

An advantage of the markerless system is that when the number of characteristic points is large, the accuracy in calculating the position and posture of a camera is improved. Another advantage of the markerless system is that when characteristic points are distributed over a wide range in a captured image, the accuracy in calculating the position and posture of a camera is improved. Another advantage of the markerless system is that even when part of characteristic points is undetectable, the position and posture of a camera may be calculated. Another advantage of the markerless system is that even when part of characteristic points is out of the image capture range of a camera, the position and posture of a camera may be calculated.

A disadvantage of the markerless system is that performance in detecting a characteristic point and performance in matching with a map point are susceptible to an environmental change and motion of a camera. Another disadvantage of the markerless system is that when a similar pattern is present around characteristic points or characteristic points themselves are similar, an mistake in matching is likely to occur and the accuracy of calculation of the position and posture of a camera is reduced. Another disadvantage of the markerless system is that when the number of characteristic points is small, the accuracy of calculation of the position and posture of a camera is reduced.

In order to compensate for the aforementioned disadvantages by the aforementioned advantages, a conventional technology 3 has been developed that calculates the position and posture of a camera by each of the marker system and the markerless system and that uses either one of the results of the calculation. In the conventional technology 3, for instance, as illustrated in FIG. 15, the coordinate system of the marker system is set to match the coordinate system of the markerless system so that the coordinate systems are easily compared. FIG. 15 is an illustration depicting an example definition of a coordinate system in the conventional technology 3. For instance, the origin 16 of the marker 15 is set to match the origin of a three-dimensional coordinate system for the map points $S_1$ to $S_6$.

In the conventional technology 3, when only one of the marker system and the markerless system has succeeded in calculating the position and posture of the camera, the result of successful calculation is used. However, when both systems provide successful calculation, criterion for selecting which one of results to be used is important.

For instance, in the conventional technology 3, in some cases, a system with higher priority is determined in advance according to application and an error in the position and posture of the camera is individually evaluated and the position and posture calculated by a system with a lower individual error are used. It is to be noted that the aforementioned conventional technologies are disclosed, for instance, in Japanese Laid-open Patent Publication No. 2013-225245, Japanese Laid-open Patent Publication No. 2000-275013, and Japanese Laid-open Patent Publication No. 2014-92984.

SUMMARY

According to an aspect of the invention, an image processing device includes a memory and a processor coupled to the memory and configured to: execute a first estimation process including detecting a marker having a predetermined shape from a captured image obtained from a camera, and estimating first position and posture of the camera at a time when the captured image is captured, based on a shape of the marker, execute a second estimation process including obtaining a map point in a three-dimensional space from the memory, and estimating second position and posture of the camera at the time when the captured image is captured, based on a correspondence between a projection point in which the map point is projected on the captured image and a characteristic point extracted from the captured image, and select the first position and posture or the second position and posture based on a result of comparison between a first translational component of the first position and posture and a second translational component of the second position and posture.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a table illustrating the characteristics of accuracy of calculation of the position and posture of a camera by a marker system/markerless system.

FIG. 4 is a table illustrating an example data structure of initial map information.

DESCRIPTION OF EMBODIMENTS

Figure 2:
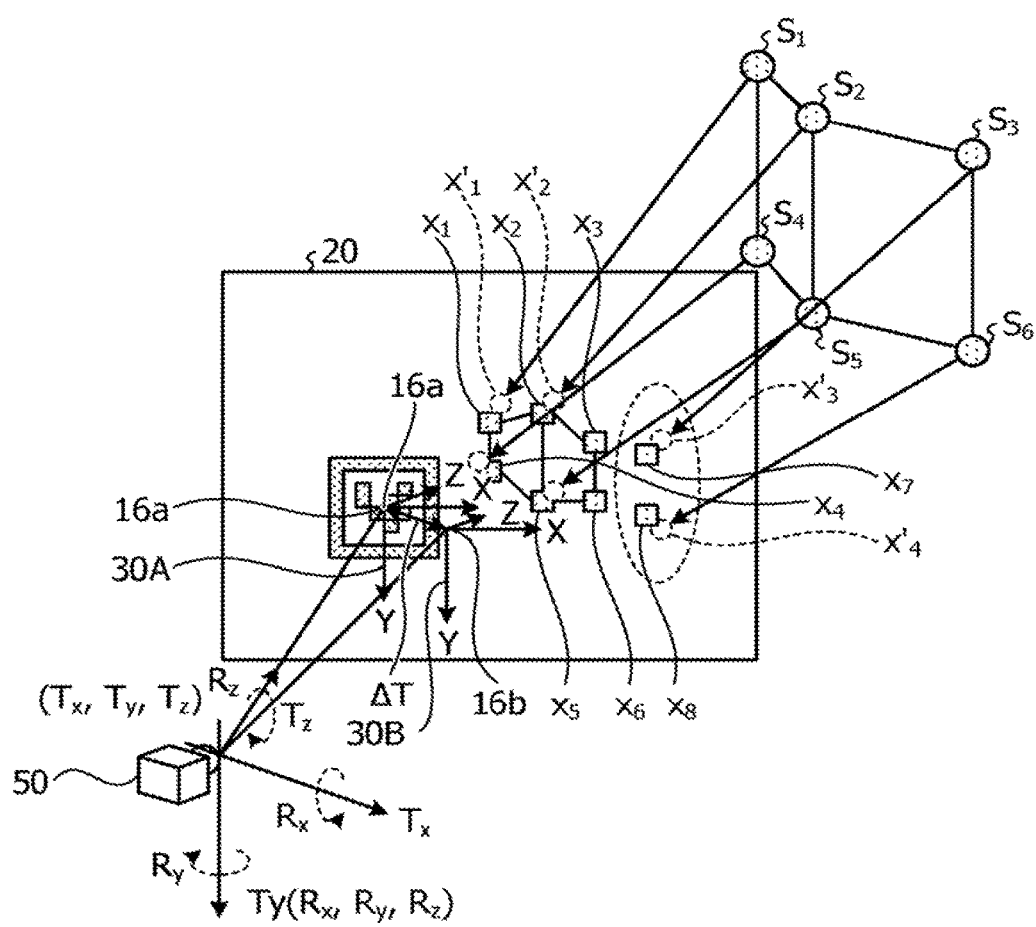
FIG. 2 is an illustration depicting an example displacement of a translational component in a marker system and a markerless system.

In the conventional technologies described above, there is a problem in that the position and posture of a camera may not be identified with high accuracy.

For instance, since the marker system and the markerless system have different factors in reduction of the accuracy of calculation of the position and posture of a camera, when a system with higher priority is determined in advance, an inappropriate system may be selected. In addition, as described below, it is difficult to evaluate an error in the position and posture calculated by each of the marker system and the markerless system, and thus an inappropriate system may be selected by a technology that evaluates an error.

The true value of the position and posture of a camera may not be determined only using captured images, and thus the error is estimated in some way.

The conventional technology 3, which evaluates an error of the markerless system, uses, for instance, a re-projection error. In the conventional technology, map points, which are successfully matched with the characteristic points detected in a captured image and which are used for calculation of the camera position and posture, are re-projected on the captured image using the determined camera position and posture. The conventional technology 3 identifies 2D distance between a projection point and a matched characteristic point as an error, and adds the errors of all characteristic points, then determines that the error is small when the sum is small.

However, in the aforementioned conventional technology 3, the position and posture of the camera are calculated so that an error in the re-projection has a minimum. In the conventional technology 3, calculation is determined to be a failure in the case where the re-projection error is greater than a predetermined threshold value. Thus, the projection error tends to decrease essentially. In addition, when an mistake in matching occurs, a phenomenon may occur in which the re-projection error decreases even when the camera position and posture are away from the true value. Like this, an error may not correctly reflect the accuracy of calculated values of the camera position and posture depending on the adopted calculation method.

On the other hand, in the conventional technology 3 that evaluates an error in the marker system, characteristic point detection and matching are not performed when the position and posture are calculated in the marker system, and thus the same re-projection error as in the markerless system may not be obtained. As a replacement method, in the conventional technology 3, a result of characteristic point detection and matching performed in the markerless system may be used and an error may be obtained by performing re-projection using the camera position and posture determined in the marker system. In this case, however, the same problems as in the markerless system occurs.

Like this, in the aforementioned conventional technologies, since the position and posture of the camera may not be identified with high accuracy, for instance, when content is displayed at a predetermined position in a captured image using a result of calculation of the position and posture, the accuracy of the position is reduced.

An aspect of the present disclosure provides an image processing device, an image processing method, and an image processing program that are capable of identifying the position and posture of a camera with high accuracy.

Hereinafter, embodiments of the image processing device, the image processing method, and the image processing program disclosed in the present application will be described in detail based on the drawings. It is to be noted that this disclosure is not limited by those embodiments.

[Embodiment 1]

The attention is focused on the difference between the characteristics of accuracy in the detection of the position and posture of a camera in the marker system/the markerless system, in particular, that the accuracy of a translational component in the marker system is increased, and the image processing device according to the embodiment 1 selects a result of estimation by either one of the marker system/the markerless system.

First, the position and posture of the camera used in the embodiment 1 is defined. The three-dimensional coordinate values of a map point of an initial map used in the markerless system are represented by Expression (5). The two-dimensional coordinates of a projection point in which a map point is projected on a captured image are represented by Expression (6).

$$P_{3D} = \begin{pmatrix} x_{3D} \\ y_{3D} \\ z_{3D} \end{pmatrix} \quad (5)$$

$$P_{2D} = \begin{pmatrix} x_{2D} \\ y_{2D} \end{pmatrix} \quad (6)$$

Here, the relationship represented by Expression (7) holds between the three-dimensional coordinates of a map point and the two-dimensional coordinates of a projection point. M included in Expression (7) is a camera internal parameter and is represented by Expression (8). RT included in Expression (7) is a matrix indicating the position and posture of the camera, and is represented by Expression (9).

$$s \begin{pmatrix} x_{2D} \\ y_{2D} \\ 1 \end{pmatrix} = M \cdot RT \cdot \begin{pmatrix} x_{3D} \\ y_{3D} \\ z_{3D} \\ 1 \end{pmatrix} \quad (7)$$

$$M = \begin{pmatrix} f_x & 0 & c_x \\ 0 & f_y & c_y \\ 0 & 0 & 1 \end{pmatrix} \quad (8)$$

$$RT = \begin{pmatrix} r_0 & r_1 & r_2 & T_x \\ r_3 & r_4 & r_5 & T_y \\ r_6 & r_7 & r_8 & T_z \end{pmatrix} \quad (9)$$

"R" of RT indicates a rotational component of the camera, and is represented by Expression (10). $R(R_x)$, $R(R_y)$, $R(R_z)$ included in Expression (10) are represented by Expression (11), Expression (12), Expression (13), respectively. Also, "T" of RT indicates a translational component of the camera, and is represented by Expression (14).

$$R = R(R_x) \cdot R(R_y) \cdot R(R_z) = \begin{pmatrix} r_0 & r_1 & r_2 \\ r_3 & r_4 & r_5 \\ r_6 & r_7 & r_8 \end{pmatrix} \quad (10)$$

$$R(R_x) = \begin{pmatrix} 1 & 0 & 0 \\ 0 & \cos R_x & \sin R_x \\ 0 & -\sin R_x & \cos R_x \end{pmatrix} \quad (11)$$

$$R(R_y) = \begin{pmatrix} \cos R_y & 0 & -\sin R_y \\ 0 & 1 & 0 \\ \sin R_y & 0 & \cos R_y \end{pmatrix} \quad (12)$$

$$R(R_z) = \begin{pmatrix} \cos R_z & \sin R_z & 0 \\ -\sin R_z & \cos R_z & 0 \\ 0 & 0 & 1 \end{pmatrix} \quad (13)$$

$$T = \begin{pmatrix} T_x \\ T_y \\ T_z \end{pmatrix} \quad (14)$$

As described above, the position and posture of the camera are expressed by a matrix, and may be divided into a translational component and a rotational component. The accuracy of calculation of the translational component and the rotational component has specific characteristics according to the difference between the marker system/the markerless system.

FIG. 1 is a table illustrating the characteristics of the accuracy of calculation of the position and posture of a camera by a marker system/markerless system. When the accuracy of the translational component is compared between the marker system and the markerless system, the accuracy in the marker system is higher. For instance, in the markerless system, when a shape similar to a natural characteristic point is present in the vicinity thereof, the accuracy may be reduced.

When the accuracy of the rotational component is compared between the marker system and the markerless system, the accuracy in the markerless system is higher. For instance, in the marker system, when a marker is captured from the front, the accuracy may be reduced significantly.

In the marker system, the reference point of a marker has an artificial pattern which is easily detected by image processing technology, and thus the accuracy in the detection of 2D coordinate values by the marker system in a captured image is significantly high. This is much higher than the accuracy in the detection of 2D coordinate values of a characteristic point by the markerless system. The translational component (particularly, x, y component) is relative to the center of mass coordinates of reference points, and thus the calculation accuracy is increased. On the other hand, the rotational component is calculated based on the relative positional relationship between reference points in a captured image, and due to the characteristics of the expression for the calculation, the calculation accuracy when an image is captured from the front is much lower than the calculation accuracy when an image is captured diagonally.

Since the markerless system has a lower accuracy in the detection of 2D coordinate values of a characteristic point, the accuracy of calculation of the translational component is lower than the accuracy in the marker system. On the other hand, a difference in the accuracy of calculation of the rotational component depending on an image capture direction as in the marker system is not observed. In particular, in the markerless system, when an mistake in matching characteristic points occurs, a large displacement of the translational component from the true value may be made.

FIG. 2 is an illustration depicting an example displacement of a translational component in the marker system and the markerless system. In FIG. 2, for instance, in the markerless system, it is assumed that characteristic point $x_7$ and projection point $x_3'$, and characteristic point $x_8$ and projection point $x_4'$ are brought into correspondence with each other by mistake although characteristic points $x_1$ to $x_7$ and projection points $x_1'$ to $x_7'$ are supposed to be brought into correspondence with each other. Then, the accuracy of the position and posture of the camera is reduced and displacement of $\Delta T$ occurs in the translational component. It is to be noted that an origin 16a of a coordinate system 30A of FIG. 2 is properly set by the marker system. An origin 16b of a coordinate system 30B is given in the case where a characteristic point is brought into correspondence with a projection point by mistake by the markerless system, and the origins 16a and 16b have a displacement of $\Delta T$. As can be appreciated, FIG. 2 includes reference designators, such as $S_1$ to $S_6$ and 20, which have been previously discussed, and whose further discussion is omitted here for brevity.

Based on the characteristics described in FIGS. 1 and 2, the image processing device according to the embodiment 1 compares the translational components of calculated values of the position and posture of the camera estimated by the marker system, and calculated values of the position and posture of the camera estimated by the markerless system. In the following description, the position and posture of the camera estimated by the marker system are referred to as first position and posture, and the position and posture of the camera estimated by the markerless system are referred to as second position and posture.

When the difference between the translational component of the first position and posture and the translational component of the second position and posture is less than a threshold value, the image processing device selects the second position and posture, and performs the subsequent processing. On the other hand, when the difference between the translational component of the first position and posture and the translational component of the second position and posture is a threshold value or greater, the image processing device selects the first position and posture, and performs the subsequent processing.

Figure 3:
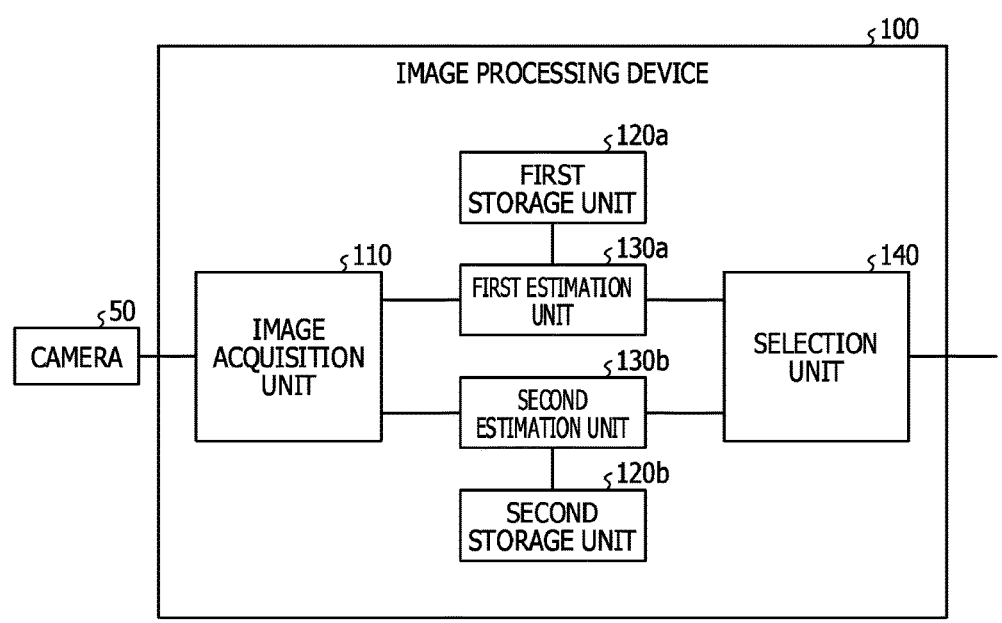
FIG. 3 is a functional block diagram illustrating the configuration of an image processing device according to an embodiment 1.

FIG. 3 is a functional block diagram illustrating the configuration of the image processing device according to the embodiment 1. As illustrated in FIG. 3, an image processing device 100 is connected to the camera 50. The image processing device 100 has an image acquisition unit 110, a first storage unit 120a, a second storage unit 120b, a first estimation unit 130a, a second estimation unit 130b, and a selection unit 140.

The camera 50 is a device that captures an image. An image captured by the camera 50 is referred to as a captured image. The camera 50 outputs the information on a captured image to the image acquisition unit 110. The camera 50 is movable to a plurality of positions, and captures an image, for instance, at an image capture position Ca and an image capture position Cb. A user may manually change the image capture position of the camera 50, or the image processing device 100 may automatically change the image capture position of the camera 50.

The image acquisition unit 110 is a processing unit that obtains information on a captured image from the camera 50. The image acquisition unit 110 outputs the information on a captured image to the first estimation unit 130a and the second estimation unit 130b.

Figure 11:
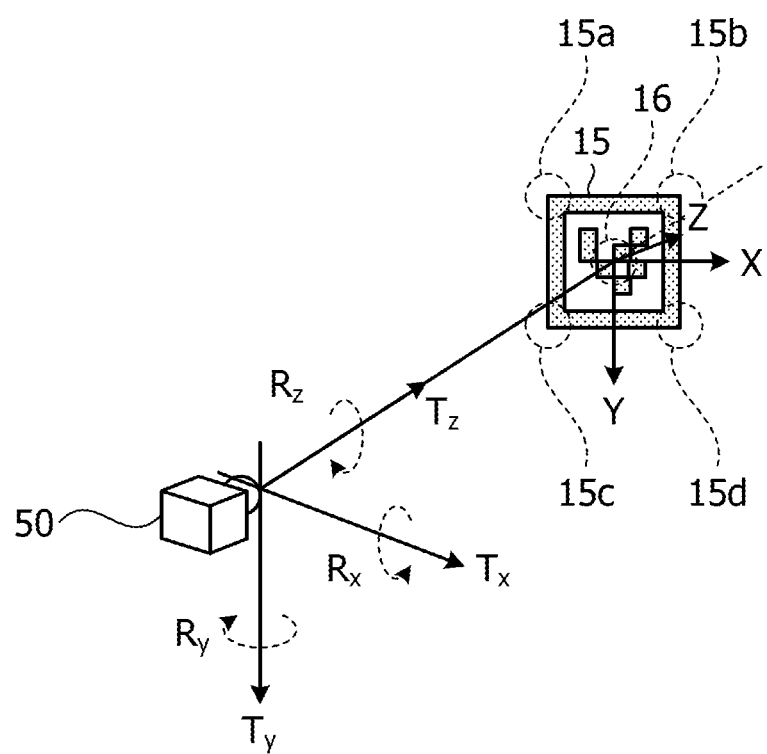
FIG. 11 is an illustration depicting an example definition of a coordinate system and the position and posture of a camera in the marker system.

The first storage unit 120a is a storage unit that stores information to be utilized when the first position and posture of the camera are calculated by the marker system. For instance, the first storage unit 120a stores information on the pattern of a marker, and the shape of a marker, and information on the camera internal parameter. The information on the pattern of a marker, and the shape of a marker may correspond to the pattern and shape of the marker 15 illustrated in FIG. 11, for instance. The camera internal parameter is represented by Expression (8), and is set in advance.

The second storage unit 120b is a storage unit that stores information to be utilized when the second position and posture of the camera are calculated by the markerless system. For instance, the second storage unit 120b stores initial map information and information on the camera internal parameter.

FIG. 4 is a table illustrating an example data structure of the initial map information. As illustrated in FIG. 4, the initial map information brings an identification number, three-dimensional coordinates, amount of characteristic, and an image pattern template into correspondence with one another. The identification number is a number that uniquely identifies a map point. The amount of characteristic is such that the values of pixels around a projection point in which a map point is projected on a captured image are arranged in a predetermined order. The image pattern template is an image in a predetermined range including a projection point in which a map point is projected on a captured image.

The first estimation unit 130a is a processing unit that estimates the first position and posture of the camera 50 by the marker system. The first estimation unit 130a detects a marker from a captured image based on the pattern, shape of a marker stored in the first storage unit 120a, and estimates the first position and posture based on the reference point of the marker and a camera parameter. It is to be noted that the first estimation unit 130a may estimate the first position and posture based on a conventional technology of any marker system. For instance, the first estimation unit 130a estimates the first position and posture based on nonpatent literature "An Augmented Reality System and its Calibration based on Marker Tracking by Kato et al, Journal of Virtual Reality Society of Japan, 4(4), pp. 607-616, December in 1999".

The first estimation unit 130a outputs information on the first position and posture to the selection unit 140. The information on the first position and posture includes the rotational component and translational component of the camera 50. It is to be noted that in the case where a marker is not detectable from a captured image and estimation of the first position and posture is not possible, the first estimation unit 130a outputs information on failed estimation of the first position and posture to the selection unit 140.

Figure 12:
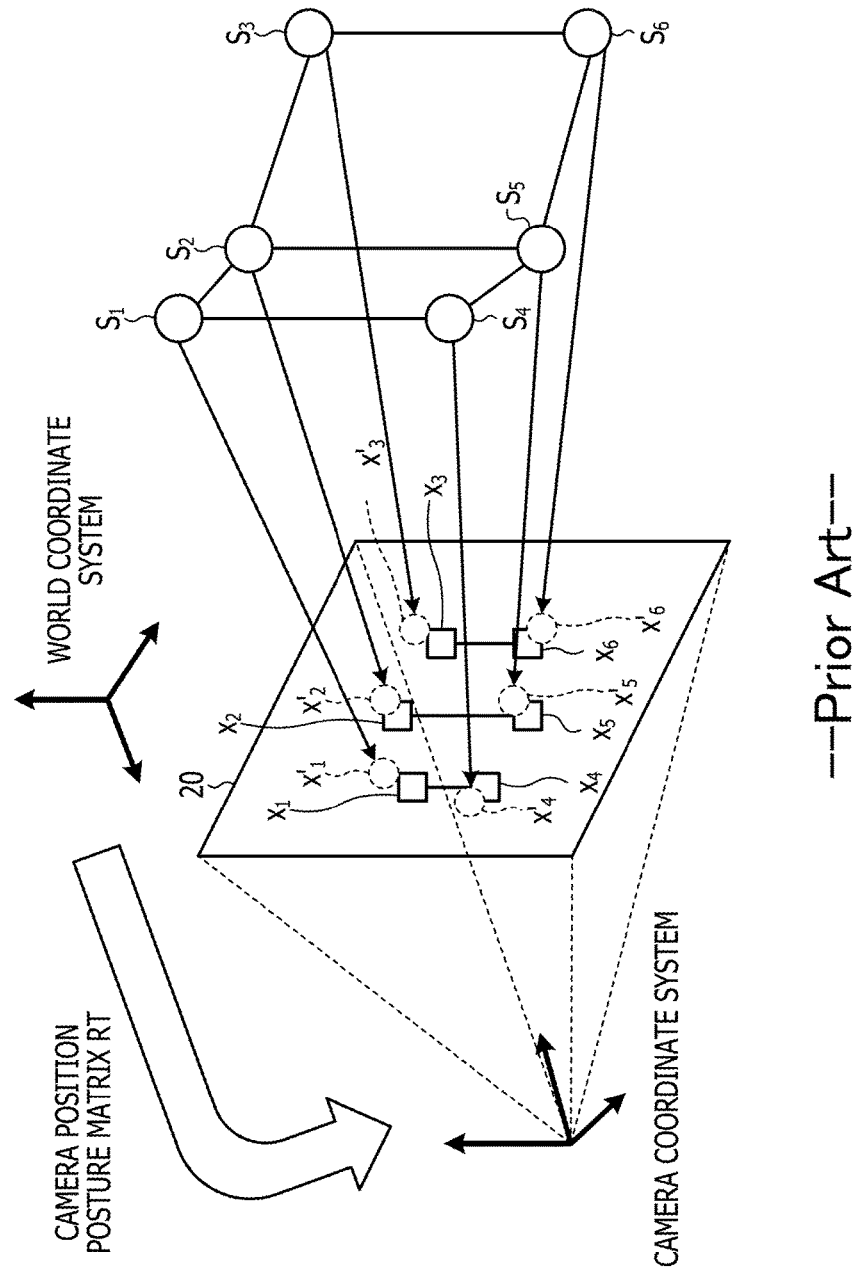
FIG. 12 is an illustration for explaining conventional technology 2 that determines the position and posture of a camera.
Figure 13:
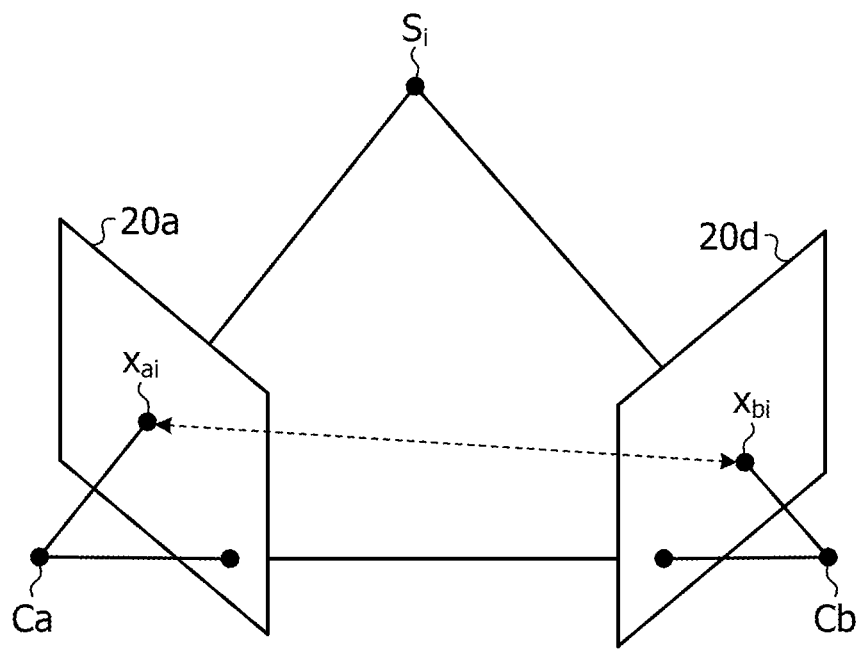
FIG. 13 is an illustration for explaining the conventional technology 2 that generates an initial map.
Figure 14:
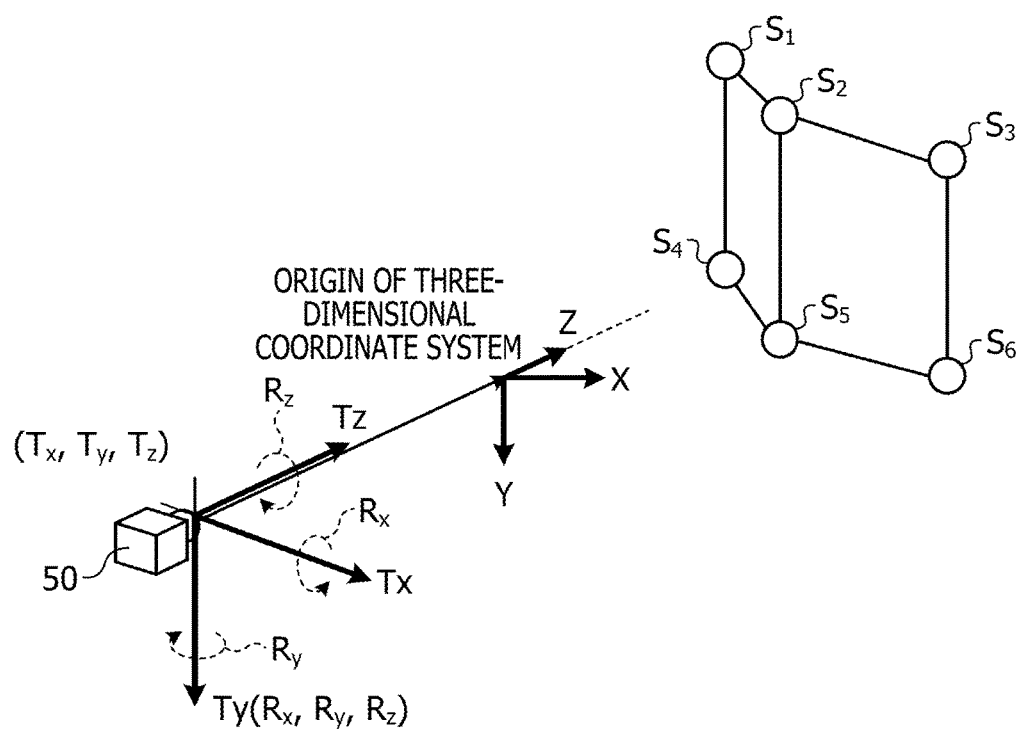
FIG. 14 is an illustration depicting an example definition of a coordinate system and the position and posture of a camera in the markerless system.
Figure 15:
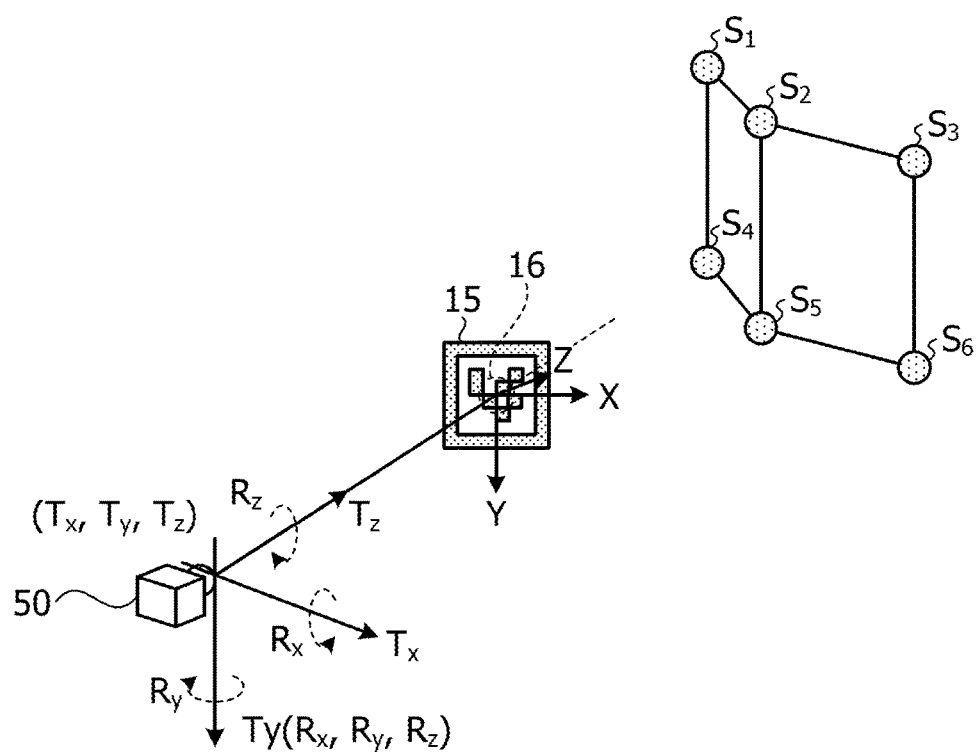
FIG. 15 is an illustration depicting an example definition of a coordinate system in conventional technology 3.

The second estimation unit 130b is a processing unit that estimates the second position and posture of the camera 50 by the markerless system. For instance, the second estimation unit 130b estimates the second position and posture by performing the processing illustrated in FIG. 12. The second estimation unit 130b compares a characteristic point in a captured image with a projection point in which a map point in the initial map information is projected on the captured image, and performs matching of a pair of a projection point and a characteristic point having the shortest distance. The second estimation unit 130b, after performing matching, determines the position and posture of the camera by calculating a camera position, posture matrix RT for which the square sum E calculated by Expression (4) has a minimum.

The second estimation unit 130b outputs information on the second position and posture to the selection unit 140. The information on the second position and posture includes the rotational component and translational component of the camera 50. It is to be noted that for instance, in the case where the value obtained by dividing the number of pairs of a projection point corresponding to a map point and a characteristic point by the number of characteristic points is less than a predetermined value, the second estimation unit 130b outputs information on failed estimation of the second position and posture to the selection unit 140.

The selection unit 140 is a processing unit that obtains information on the first position and posture and the second position and posture, and that selects the first position and posture or the second position and posture based on a result of comparison between the translational component of the first position and posture and the translational component of the second position and posture. The selection unit 140 outputs information on the selected position and posture to an external device which is not illustrated, the information being provided as the information on the position and posture of the camera 50. The external device displays additional information such as computer graphics based on the obtained information on the position and posture of the camera 50, the additional information being superimposed on a captured image displayed on a screen.

When the difference between the translational component of the first position and posture and the translational component of the second position and posture is a threshold value $\Delta T$ or greater, the selection unit 140 selects the first position and posture. When the difference between the translational component of the first position and posture and the translational component of the second position and posture is less than the threshold value $\Delta T$, the selection unit 140 selects the second position and posture. For instance, the selection unit 140 may calculate the difference between the translational component of the first position and posture and the translational component of the second position and posture based on Expression (15). In Expression (15), ($T_{x1}$, $T_{y1}$, $T_{z1}$) represents the translational component of the first position and posture. ($T_{x2}$, $T_{y2}$, $T_{z2}$) represents the translational component of the second position and posture.

$$D=(T_{x1}-T_{x2})^2+(T_{y1}-T_{y2})^2+(T_{z1}-T_{z2})^2 \quad (15)$$

It is to be noted that when estimation of the first position and posture has failed and estimation of the second position and posture has succeeded, the selection unit 140 selects the second position and posture. When estimation of the second position and posture has failed and estimation of the first position and posture has succeeded, the selection unit 140 selects the first position and posture. When estimation of the first position and posture and the second position and posture has failed, the selection unit 140 outputs an error.

Figure 5:
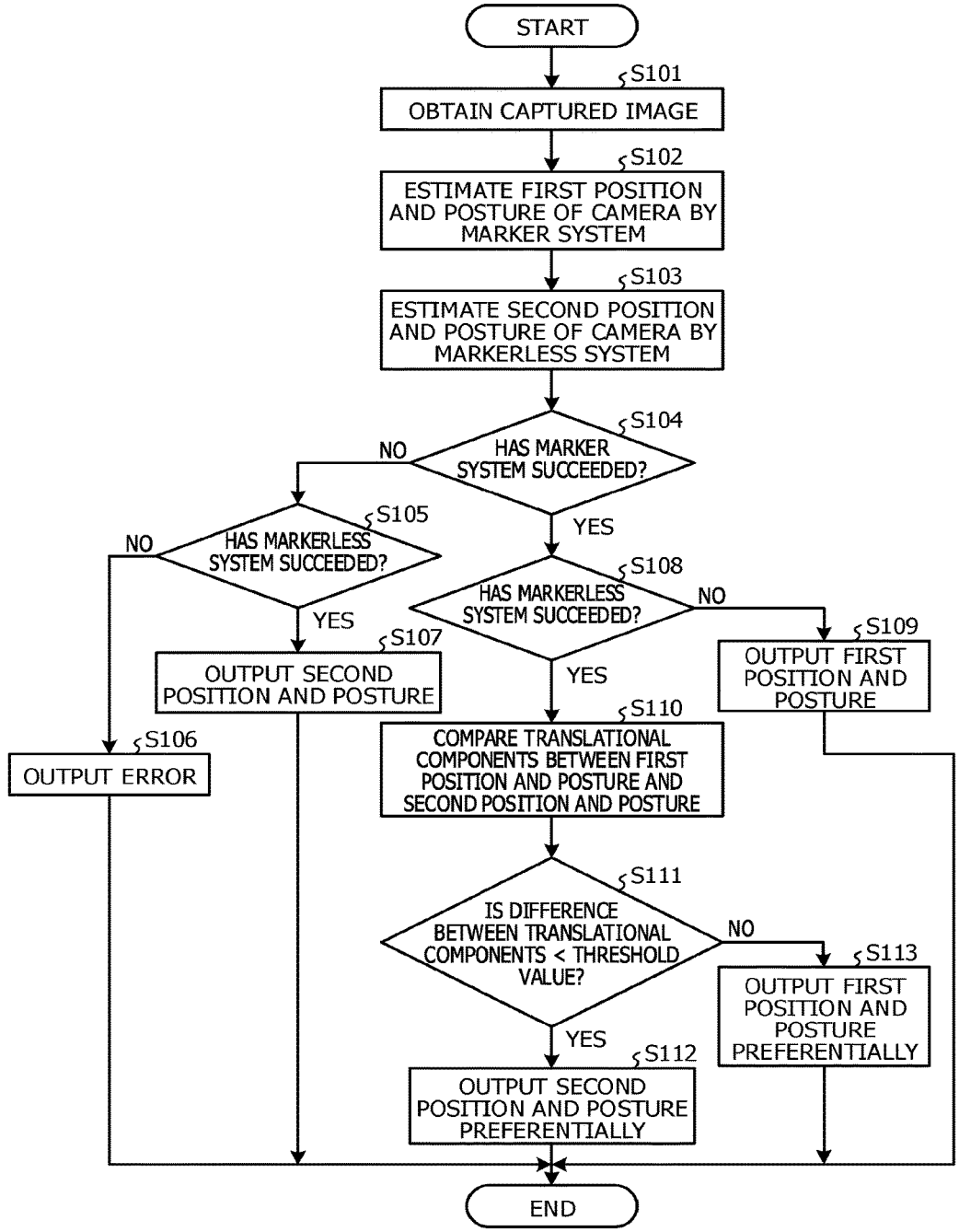
FIG. 5 is a flow chart illustrating the steps of processing of the image processing device according to the embodiment 1.

Next, the steps of processing of the image processing device 100 according to the embodiment 1 will be described. FIG. 5 is a flow chart illustrating the steps of processing of the image processing device according to the embodiment 1. As illustrated in FIG. 5, the image acquisition unit 110 of the image processing device 100 obtains a captured image from the camera 50 (step S101). The first estimation unit 130a of the image processing device 100 calculates the first position and posture of the camera 50 by the marker system (step S102). The second estimation unit 130*b* of the image processing device 100 calculates the second position and posture of the camera 50 by the markerless system (step S103).

When estimation of the position and posture by the marker system has succeeded (Yes in step S104), the processing flow of the selection unit 140 of the image processing device 100 proceeds to step S108. When estimation of the position and posture by the marker system has failed (No in step S104), the processing flow of the selection unit 140 proceeds to step S105.

Step S105 is described in the following: when estimation of the position and posture by the markerless system has failed (No in step S105), the selection unit 140 outputs an error (step S106). When estimation of the position and posture by the markerless system has succeeded (Yes in step S105), the selection unit 140 outputs the second position and posture (step S107).

Step S108 is described in the following: when estimation of the position and posture by the markerless system has failed (No in step S108), the selection unit 140 outputs the first position and posture (step S109). When estimation of the position and posture by the markerless system has succeeded (Yes in step S108), the processing flow of the selection unit 140 proceeds to step S110.

The selection unit 140 compares the translational components between the first position and posture and the second position and posture (step S110). When the difference between the translational components is less than a threshold value (Yes in step S111), the selection unit 140 preferentially outputs the second position and posture (step S112). On the other hand, when the difference between the translational components is a threshold value or greater (No in step S111), the selection unit 140 preferentially outputs the first position and posture (step S113).

Next, the effect of the image processing device 100 according to the embodiment 1 will be described. When the difference between the translational component of the first position and posture and the translational component of the second position and posture is less than a threshold value, the image processing device 100 preferentially selects the second position and posture. On the other hand, when the difference between the translational component of the first position and posture and the translational component of the second position and posture is a threshold value or greater, the image processing device 100 preferentially selects the first position and posture. For instance, as illustrated in FIG. 1, the accuracy of the translational component is higher in the marker system than in the markerless system, and the accuracy of the rotational component is higher in the markerless system than in the marker system. For this reason, it is possible to identify the position and posture of the camera 50 with high accuracy by making a selection as described above.

[Embodiment 2]

When it is determined that the second position and posture is preferentially selected, the image processing device according to the embodiment 2 re-evaluates the accuracy of the second position and posture, and determines whether or not the second position and posture are to be actually outputted. In this manner, the accuracy of calculation of the second position and posture calculated by the markerless system may be confirmed, and thus highly accurate AR technology is achievable.

Also, when it is determined that the first position and posture are preferentially selected or it is determined that the accuracy of the second position and posture is low, the image processing device according to the embodiment 2 recalculates the second position and posture. The image processing device, when recalculating the second position and posture, uses the value of the first position and posture as the initial value. The accuracy of calculation of the second position and posture by the markerless system is more likely to improve as the value of the initial value is closer to the true value, for instance.

Figure 6:
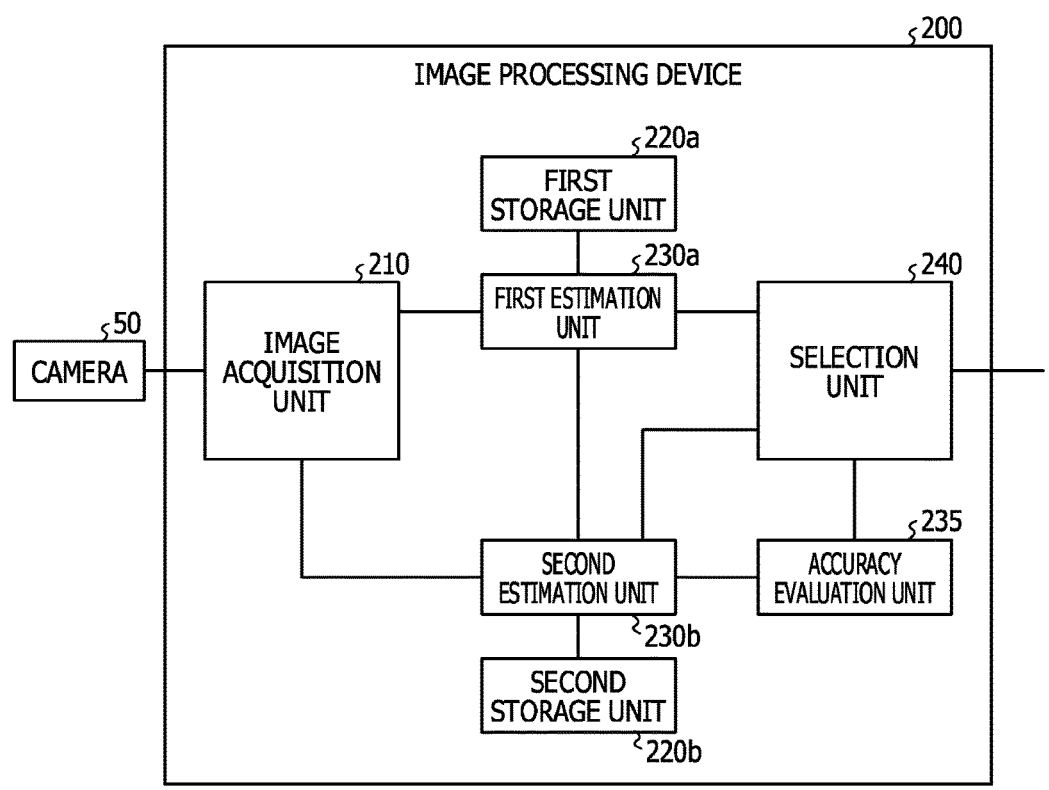
FIG. 6 is a functional block diagram illustrating the configuration of an image processing device according to an embodiment 2.

FIG. 6 is a functional block diagram illustrating the configuration of the image processing device according to the embodiment 2. As illustrated in FIG. 6, the image processing device 200 is connected to a camera 50. The image processing device 200 has an image acquisition unit 210, a first storage unit 220*a*, a second storage unit 220*b*, a first estimation unit 230*a*, a second estimation unit 230*b*, an accuracy evaluation unit 235, and a selection unit 240.

The description for the camera 50, the image acquisition unit 210, the first storage unit 220*a* and the second storage unit 220*b* is the same as the description for the camera 50, the image acquisition unit 110, the first storage unit 120*a*, and the second storage unit 120*b* illustrated in FIG. 3.

The first estimation unit 230*a* is a processing unit that estimates the first position and posture of the camera 50 by the marker system. The processing of estimation of the first position and posture by the first estimation unit 230*a* is the same as the processing of the first estimation unit 130*a* illustrated in FIG. 3. The first estimation unit 230*a* outputs information on the first position and posture to the selection unit 240 and the second estimation unit 230*b*. It is to be noted that when a marker is not detectable from a captured image and estimation of the first position and posture is not possible, the first estimation unit 230*a* outputs information on failed estimation of the first position and posture to the selection unit 240.

The second estimation unit 230*b* is a processing unit that estimates the second position and posture of the camera 50 by the markerless system. The processing of estimation of the second position and posture by the second estimation unit 230*b* is the same as the processing of the second estimation unit 130*b* illustrated in FIG. 3. The second estimation unit 230*b* outputs information on the second position and posture to the selection unit 240. In addition, the second estimation unit 230*b* outputs information on the number of successfully matched pairs and the number of characteristic points extracted from a captured image to the accuracy evaluation unit 235.

It is to be noted that when a recalculation request is received from the selection unit 240, the second estimation unit 230*b* re-estimates the second position and posture of the camera 50 by the markerless system. The second estimation unit 230*b*, when re-estimating the second position and posture, utilizes the first position and posture as the initial value, the first position and posture being obtained from the first estimation unit 230*a*. The second estimation unit 230*b* outputs information on the re-estimated second position and posture to the selection unit 240.

Here, the case has been described where the second estimation unit 230*b*, when re-estimating the second position and posture, utilizes the first position and posture as the initial value. However, the embodiment is not limited to this. For instance, the second estimation unit 230*b* may utilize the second position and posture estimated in an immediate previous captured image as the initial value. In addition, the information on the first position and posture may be obtained from the selection unit 240.

The accuracy evaluation unit 235 is a processing unit that evaluates the accuracy of the second position and posture. The accuracy evaluation unit 235 outputs a result of evaluation of the accuracy to the selection unit 240. For instance, the accuracy evaluation unit 235 calculates a ratio of the number of successfully matched pairs to the number of characteristic points detected in a captured image. When the ratio is a predetermined ratio or greater, the accuracy evaluation unit 235 determines that the accuracy of the second position and posture is satisfactory. When the ratio is less than a predetermined ratio, the accuracy evaluation unit 235 determines that the accuracy of the second position and posture is unsatisfactory.

It is to be noted that the accuracy evaluation unit 235 may evaluate the accuracy of the second position and posture by another method. The accuracy evaluation unit 235 re-projects a map point on the captured image using the second position and posture, and calculates a ratio of the number of successfully matched pairs to the number of re-projected map points. When the ratio is a predetermined ratio or greater, the accuracy evaluation unit 235 determines that the accuracy of the second position and posture is satisfactory. When the ratio is less than a predetermined ratio, the accuracy evaluation unit 235 determines that the accuracy of the second position and posture is unsatisfactory. The selection unit 240 described later may have the function of the accuracy evaluation unit 235.

The selection unit 240 is a processing unit that obtains information on the first position and posture and the second position and posture, and that selects the first position and posture or the second position and posture. The selection unit 240 outputs information on the selected position and posture to an external device which is not illustrated, the information being provided as the information on the position and posture of the camera 50. The external device displays additional information such as computer graphics based on the obtained information on the position and posture of the camera 50, the additional information being superimposed on a captured image displayed on a screen.

When the difference between the translational component of the first position and posture and the translational component of the second position and posture is less than the threshold value ΔT, and the result of the evaluation of the second position and posture is satisfactory, the selection unit 240 selects the second position and posture.

On the other hand, when the difference between the translational component of the first position and posture and the translational component of the second position and posture is the threshold value ΔT or greater, or the result of the evaluation of the second position and posture is unsatisfactory, the selection unit 240 performs the subsequent processing.

The selection unit 240 outputs a recalculation request to the second estimation unit 230b, and causes the second estimation unit 230b to re-estimate the second position and posture. The selection unit 240 performs processing to make a comparison with the difference between the translational components of the first position and posture and the second position and posture. When the difference between the translational component of the first position and posture and the translational component of the re-estimated second position and posture is less than the threshold value ΔT, and the result of the evaluation of the second position and posture is satisfactory, the selection unit 240 selects the second position and posture.

On the other hand, when the difference between the translational component of the first position and posture and the translational component of the re-estimated second position and posture is threshold value ΔT or greater, and the result of the evaluation of the second position and posture is unsatisfactory, the selection unit 240 selects the first position and posture.

Figure 7:
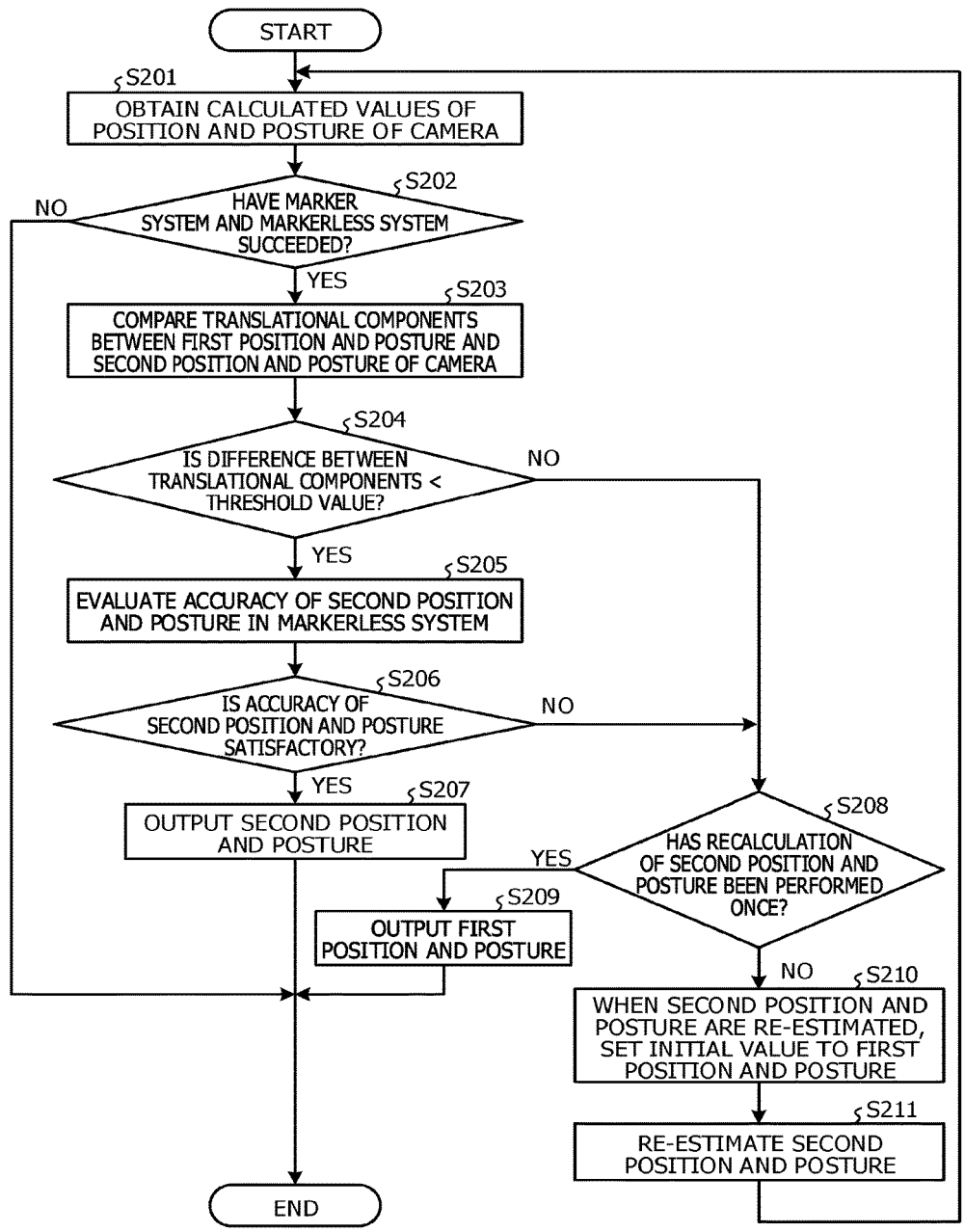
FIG. 7 is a flow chart illustrating the steps of processing of the image processing device according to the embodiment 2.

Next, the steps of processing of the image processing device 200 according to the embodiment 2 will be described. FIG. 7 is a flow chart illustrating the steps of processing of the image processing device according to the embodiment 2. As illustrated in FIG. 7, the selection unit 240 of the image processing device 200 obtains calculated values of the position and posture of the camera 50 from the first estimation unit 230a and the second estimation unit 230b (step S201).

The selection unit 240 determines whether or not estimation of the position and posture of the camera by the marker system and the markerless system has succeeded (step S202). When estimation of the position and posture of the camera by the marker system and the markerless system has not succeeded (No in step S202), the selection unit 240 terminates the processing.

On the other hand, when estimation of the position and posture of the camera by the marker system and the markerless system has succeeded (Yes in step S202), the selection unit 240 compares the translational components between the first position and posture and the second position and posture of the camera (step S203).

When the difference between the translational components is not less than a threshold value (No in step S204), the processing flow of the selection unit 240 proceeds to step S208. When the difference between the translational components is less than a threshold value (Yes in step S204), the processing flow of the selection unit 240 proceeds to step S205.

In step S205, the accuracy evaluation unit 235 of the image processing device 200 evaluates the accuracy of the second position and posture in the markerless system (step S205). When the accuracy of the second position and posture is satisfactory (Yes in step S206), the selection unit 240 outputs the second position and posture (step S207). On the other hand, when the accuracy is unsatisfactory (No in step S206), the processing flow of the selection unit 240 proceeds to step S208.

In step S208, the selection unit 240 of the image processing device 200 determines whether or not recalculation of the second position and posture has been performed once (step S208). When recalculation of the second position and posture has been performed once (Yes in step S208), the selection unit 240 outputs the first position and posture (step S209).

On the other hand, when recalculation of the second position and posture has not been performed once (No in step S208), the processing flow of the selection unit 240 proceeds to step S210. The second estimation unit 230b of the image processing device 200, when re-estimating the second position and posture, sets the initial value to the first position and posture (step S210). The second position and posture are re-estimated (step S211), and the processing flow of the selection unit 240 proceeds to step S201.

Next, the effect of the image processing device 200 according to the embodiment 2 will be described. When it is determined that the second position and posture are preferentially selected, the image processing device 200 re-evaluates the accuracy of the second position and posture, and determines whether or not the second position and posture are to be actually outputted. In this manner, the accuracy of calculation of the second position and posture calculated by the markerless system may be confirmed, and thus highly accurate AR technology is achievable.

Also, when it is determined that the first position and posture are preferentially selected or it is determined that the accuracy of the second position and posture is low, the image processing device 200 recalculates the second position and posture. Here, the image processing device 200, when recalculating the second position and posture, uses the value of the first position and posture as the initial value. The accuracy of calculation of the second position and posture by the markerless system is more likely to improve as the value of the initial value is closer to the true value, for instance. Thus, it is possible to further improve the accuracy of the position and posture of the camera 50.

How large the threshold value ΔT for the translational component is set depends on desired accuracy of the display position of the content information to be displayed in a superimposed manner in the application. When the display position of the content may be roughly defined, a user may set a large threshold value ΔT. However, when high accuracy of the display position is requested, the threshold value ΔT is set to be small.

Figure 8:
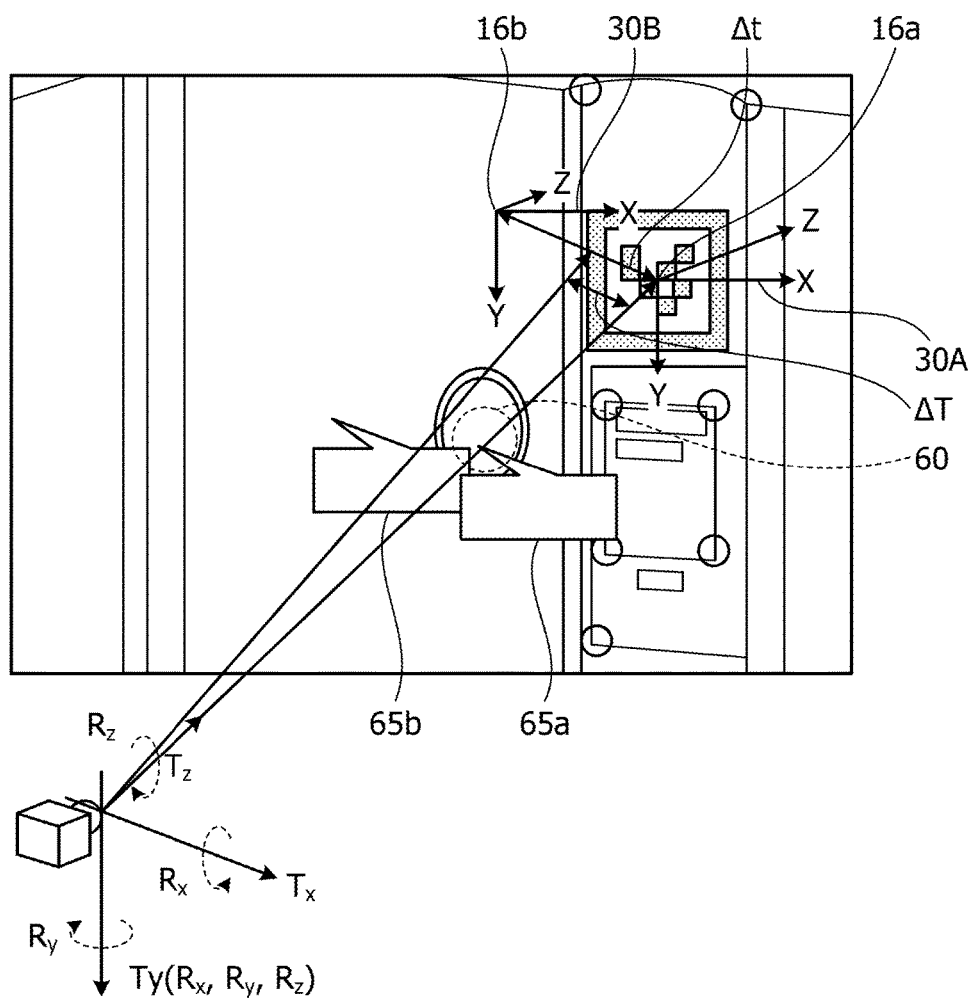
FIG. 8 is an illustration depicting an example definition of threshold value $\Delta T$.

FIG. 8 is an illustration depicting an example definition of the threshold value ΔT. FIG. 8 illustrates the position and posture of the camera 50 with the position and posture fixed to the same position in the world coordinate system. The origin 16a of the coordinate system 30A of FIG. 8 is properly set by the marker system. The origin 16b of the coordinate system 30B is set by the markerless system. An area 60 indicates an allowable display range of content. A content 65a is displayed on the captured image using the first position and posture. A content 65b is displayed on the captured image using the second position and posture. For instance, as illustrated in FIG. 8, Δt is the difference between the translational component of the first position and posture and the translational component of the second position and posture, and when Δt is ΔT or greater, the content 65a is not within the area 60.

Also, although comparison between the translational components may be made using the three-dimensional vector $(T_x, T_y, T_z)$ of the camera position and posture, the accuracy of the display position of content information on a camera-captured image is essentially important in the AR technology. Thus, the selection units 140, 240 may make the comparison using the two-dimensional coordinate point (Tx2D, Ty2D) in which the position and posture of the camera are transformed and projected on a camera-captured image. In this case, the two-dimensional coordinate point (Tx2D, Ty2D) in which the origin of the coordinate system of a marker is transformed and projected on a camera-captured image is at the position (center of mass of the coordinates of 4 corners) of the origin in the marker, thereby providing advantages of visually easy determination in processing.

Figure 9:
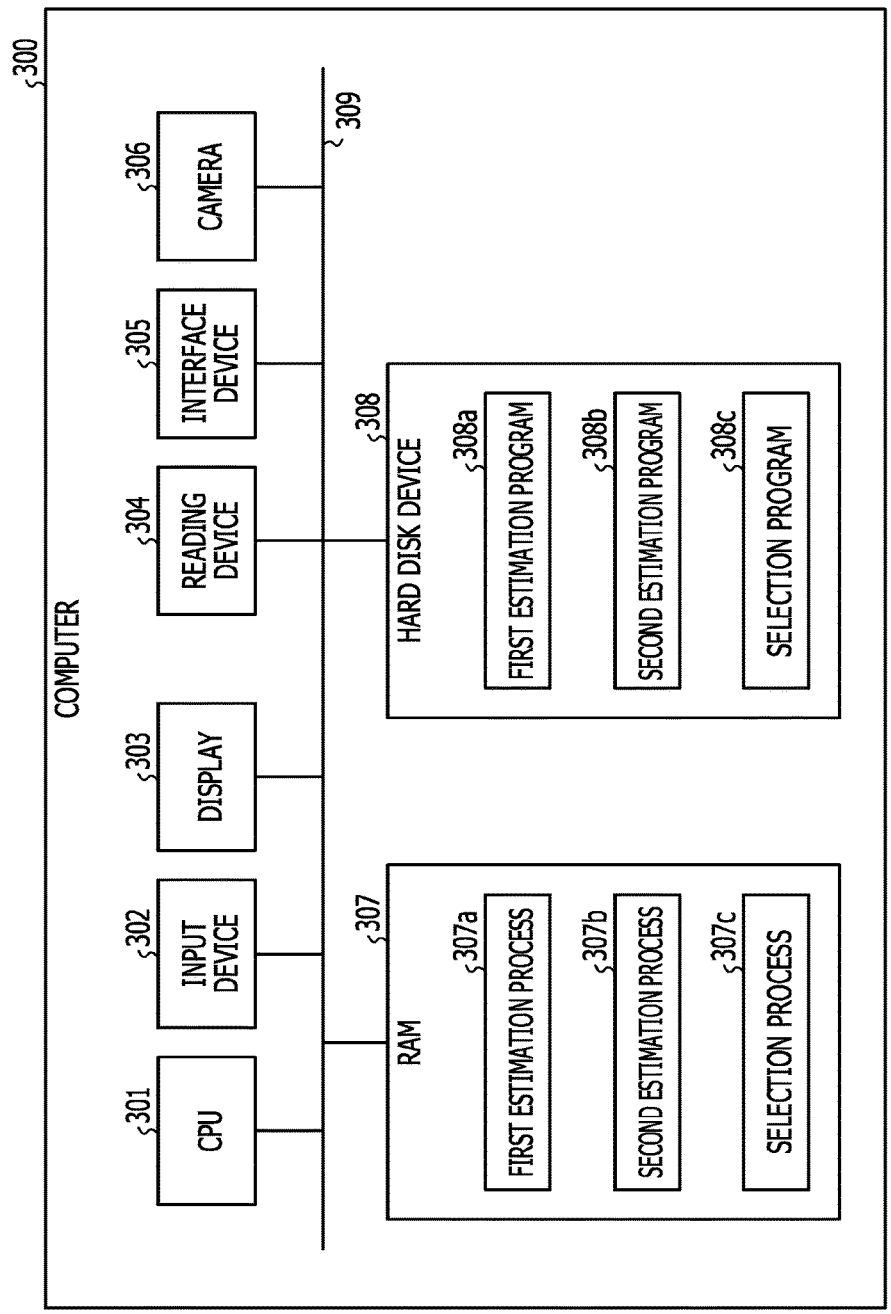
FIG. 9 is a diagram illustrating an example computer that executes an image processing program.
Figure 10:
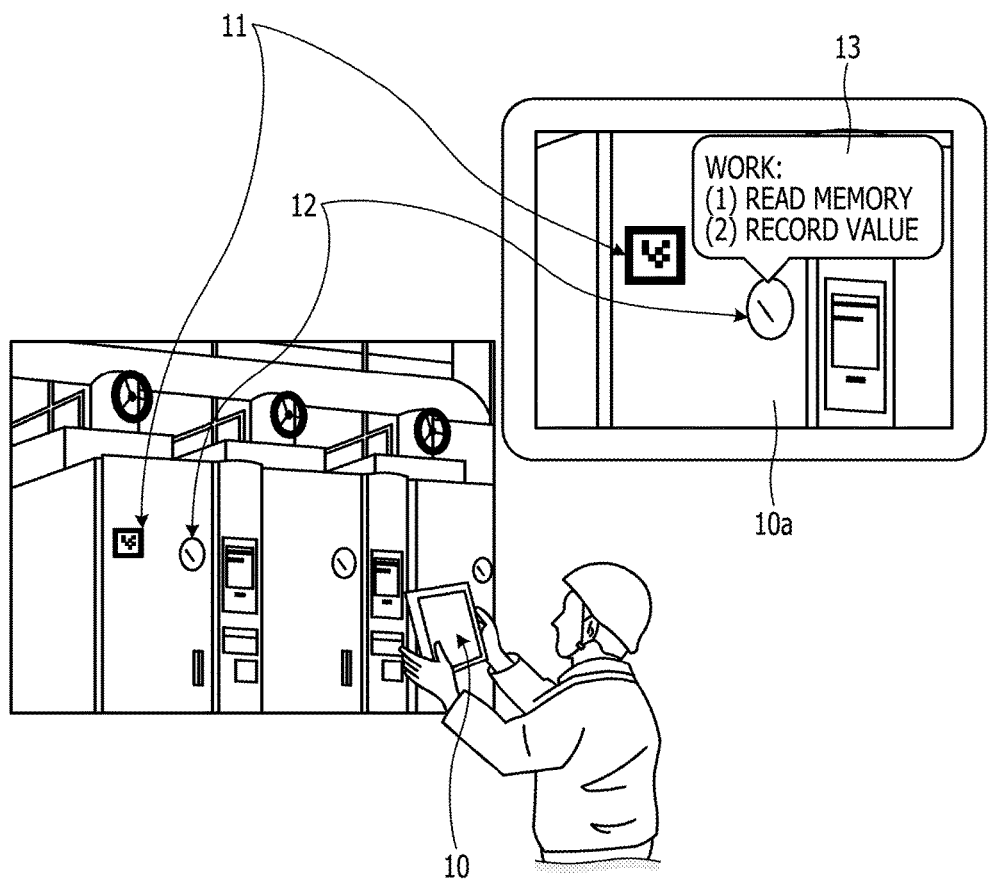
FIG. 10 is an illustration depicting an example AR technology.

Next, an example computer that executes an image processing program which achieves the same function as the image processing devices 100, 200 illustrated in the aforementioned embodiments will be described. FIG. 9 is a diagram illustrating an example computer that executes an image processing program.

As illustrated in FIG. 9, a computer 300 has a CPU 301 that executes various arithmetic processing, an input device 302 that receives an input of data from a user, and a display 303. In addition, the computer 300 has a reading device 304 that reads a program from a storage medium, an interface device 305 that sends and receives data to and from other computers via a network, and a camera 306. Also, the computer 300 has a RAM 307 that temporarily stores various types of information, and a hard disk device 308. Each of the devices 301 to 308 is connected to a bus 309.

The hard disk device 308 has a first estimation program 308a, a second estimation program 308b, and a selection program 308c. The CPU 301 reads the first estimation program 308a, the second estimation program 308b, and the selection program 308c, and executes the programs in the RAM 307. The first estimation program 308a functions as a first estimation process 307a. The second estimation program 308b functions as a second estimation process 307b. The selection program 308c functions as a selection process 307c.

It is to be noted that the first estimation program 308a, the second estimation program 308b, and the selection program 308c do not have to be stored originally in the hard disk device 308. For instance, each program is stored in a "portable physical medium" such as a flexible disk (FD), a CD-ROM, a DVD disc, a magneto-optical disk, and an IC card. The computer 300 may read and execute the first estimation program 308a, the second estimation program 308b, and the selection program 308c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A computer comprising:
a memory; and
a central processing unit coupled to the memory and configured to:
execute a first estimation process including detecting a marker having a predetermined shape from a captured image obtained from a camera, and estimating first position and posture of the camera at a time when the captured image is captured, based on a shape of the marker,
execute a second estimation process including obtaining a map point in a three-dimensional space from the memory, and estimating second position and posture of the camera at the time when the captured image is captured, based on a correspondence between a projection point in which the map point is projected on the captured image and a characteristic point extracted from the captured image, and
select the first position and posture or the second position and posture based on a result of comparison between a first translational component of the first position and posture and a second translational component of the second position and posture,
wherein the first position and posture are selected when a difference between the first translational component and the second translational component is a predetermined value or greater, and
the second position and posture are selected when the difference between the first translational component and the second translational component is less than the predetermined value.

2. The computer according to claim 1, wherein object information is displayed on the captured image according to the selected first position and posture or second position and posture.

3. The computer according to claim 1, wherein the central processing unit is configured to evaluate an accuracy of the second position and posture when the difference between the first translational component and the second translational component is less than the predetermined value.

4. The computer according to claim 3, wherein the central processing unit is configured to
   set the first position and posture as an initial value of the position and posture of the camera when the difference between the first translational component and the second translational component is the predetermined value or greater, or when the accuracy of the second position and posture is less than a threshold value, and
   recalculate the second position and posture using the initial value.

5. An image processing method executed by a computer, the image processing method comprising:
   executing a first estimation process including detecting a marker having a predetermined shape from a captured image obtained from a camera, and estimating first position and posture of the camera at a time when the captured image is captured, based on a shape of the marker;
   executing a second estimation process including obtaining a map point in a three-dimensional space from a memory, and estimating second position and posture of the camera at the time when the captured image is captured, based on a correspondence between a projection point in which the map point is projected on the captured image and a characteristic point extracted from the captured image; and
   selecting the first position and posture or the second position and posture based on a result of comparison between a first translational component of the first position and posture and a second translational component of the second position and posture,
   wherein the selecting selects the first position and posture when a difference between the first translational component and the second translational component is a predetermined value or greater, and
   the selecting selects the second position and posture when the difference between the first translational component and the second translational component is less than the predetermined value.

6. The image processing method according to claim 5, wherein object information is displayed on the captured image according to the selected first position and posture or second position and posture.

7. The image processing method according to claim 5, further comprising:
   evaluating an accuracy of the second position and posture when the difference between the first translational component and the second translational component is less than the predetermined value.

8. The image processing method according to claim 7, further comprising:
   setting the first position and posture as an initial value of the position and posture of the camera when the difference between the first translational component and the second translational component is the predetermined value or greater, or when the accuracy of the second position and posture is less than a threshold value, and
   the executing of the second estimation process recalculates the second position and posture using the initial value.

9. A non-transitory computer-readable storage medium storing an image processing program causing a computer to execute a process, the process comprising:
   executing a first estimation process including detecting a marker having a predetermined shape from a captured image obtained from a camera, and estimating first position and posture of the camera at a time when the captured image is captured, based on a shape of the marker;
   executing a second estimation process including obtaining a map point in a three-dimensional space from a memory, and estimating second position and posture of the camera at the time when the captured image is captured, based on a correspondence between a projection point in which the map point is projected on the captured image and a characteristic point extracted from the captured image; and
   selecting the first position and posture or the second position and posture based on a result of comparison between a first translational component of the first position and posture and a second translational component of the second position and posture,
   wherein the selecting selects the first position and posture when a difference between the first translational component and the second translational component is a predetermined value or greater, and
   the selecting selects the second position and posture when the difference between the first translational component and the second translational component is less than the predetermined value.

10. The non-transitory computer-readable storage medium according to claim 9, wherein object information is displayed on the captured image according to the selected first position and posture or second position and posture.

11. The non-transitory computer-readable storage medium according to claim 9, wherein the process further comprising:
    evaluating an accuracy of the second position and posture when the difference between the first translational component and the second translational component is less than the predetermined value.

12. The non-transitory computer-readable storage medium according to claim 11, wherein the process further comprising:
    setting the first position and posture as an initial value of the position and posture of the camera when the difference between the first translational component and the second translational component is the predetermined value or greater, or when the accuracy of the second position and posture is less than a threshold value, and
    the executing of the second estimation process recalculates the second position and posture using the initial value.

* * * * *